United States Patent [19]

Shekels

[11] Patent Number: 5,729,757
[45] Date of Patent: Mar. 17, 1998

[54] SUPER-COMPUTER SYSTEM ARCHITECTURES USING STATUS MEMORY TO ALTER PROGRAM

[76] Inventor: Howard D. Shekels, 8619 N. Cardinal Dr., Phoenix, Ariz. 85028

[21] Appl. No.: 586,207

[22] Filed: Jan. 12, 1996

Related U.S. Application Data

[63] Continuation of Ser. No. 2,204, Jan. 8, 1993, abandoned, which is a continuation-in-part of Ser. No. 533,679, Jun. 5, 1990, abandoned, which is a continuation-in-part of Ser. No. 735,641, May 20, 1985, abandoned.

[51] Int. Cl.$^6$ .................................................. G06F 15/16
[52] U.S. Cl. .................. 395/800.01; 395/376; 395/392
[58] Field of Search .......................... 395/801, 800.1, 395/800.16, 800.18, 800.25, 376, 377–379, 392, 393

[56] References Cited

U.S. PATENT DOCUMENTS

| | | | |
|---|---|---|---|
| 3,699,526 | 10/1972 | Iskiyah et al. | 395/581 |
| 3,718,912 | 2/1973 | Hasbrouck et al. | 395/393 |
| 3,959,777 | 5/1976 | Kimmel | 395/581 |
| 3,983,539 | 9/1976 | Faber et al. | 395/597 |
| 4,109,311 | 8/1978 | Blum et al. | 395/567 |
| 4,380,046 | 4/1983 | Fung | 395/800.22 |
| 4,414,624 | 11/1983 | Summer, Jr. et al. | 395/800.21 |
| 4,466,057 | 8/1984 | Houseman et al. | 395/386 |
| 4,514,807 | 4/1985 | Nogi | 395/800.21 |
| 4,641,238 | 2/1987 | Kneib | 395/290 |
| 4,825,359 | 4/1989 | Ohkami et al. | 395/800.15 |
| 4,992,933 | 2/1991 | Taylor | 395/800.22 |

*Primary Examiner*—Paul V. Kulik
*Attorney, Agent, or Firm*—James H. Phillips

[57] ABSTRACT

A computer system is disclosed in which instruction sequencing is under the control of a program control computer, but each individual instruction is assigned for execution to an individual instruction computer. Each instruction computer includes programmable instruction decoding means by the modification of which the microtasks undertaken to execute an instruction are accordingly modifiable, either between successive execution cycles or during a single execution cycle. Thus, the system has the inherent ability to learn and adapt during the performance of a program. The system may be extended in two-dimensional and three-dimensional arrays to obtain a multiplication of power and to enjoy redundancy advantages.

17 Claims, 4 Drawing Sheets

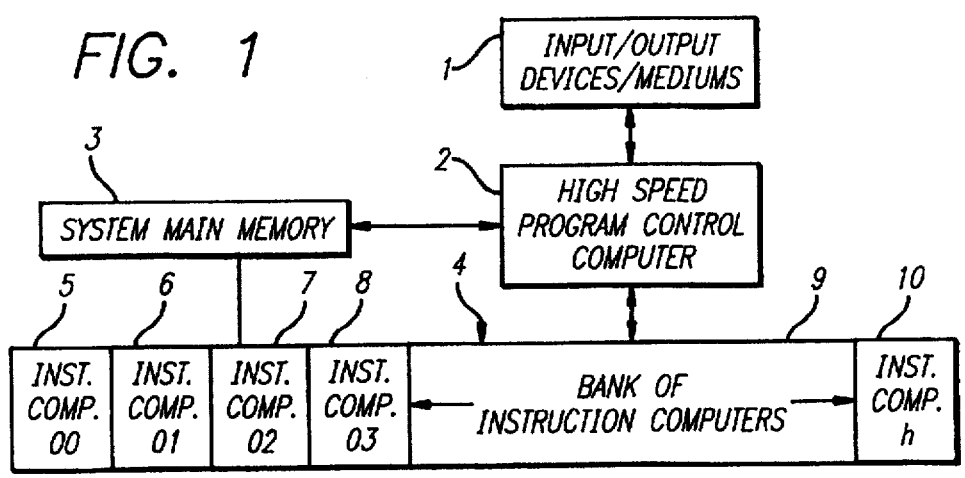
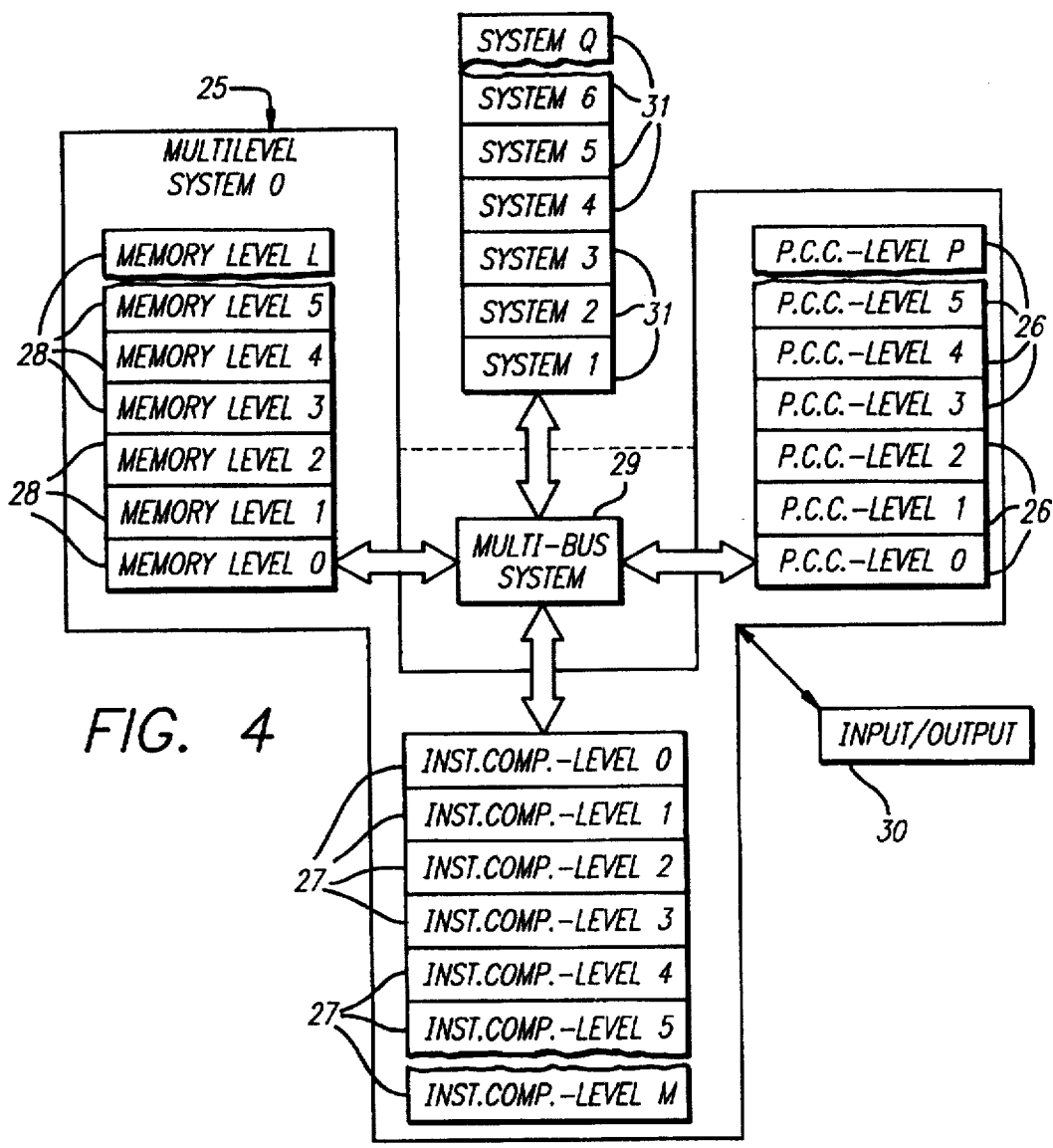

SUPER-COMPUTER SYSTEM ARCHITECTURES USING STATUS MEMORY TO ALTER PROGRAM

This is a Continuation of U.S. Ser. No. 08/002,204 filed on Jan. 8, 1993, now abandoned which is a continuation-in-part of application 07/533,679 filed on Jun. 5, 1990, now abandoned which is a continuation-in-part of application 06/735,641 filed on May. 20, 1985, now abandoned.

FIELD OF THE INVENTION

This invention relates generally to data processing systems and, more particularly, to data processing system architectures capable of efficient execution of large programs. The contemplated data processing system architectures include a multiplicity of central processing units, processing portions of the program in parallel, to execute large programs in an effective manner.

BACKGROUND OF THE INVENTION

Some current and many contemplated data processing applications for large scale, powerful computer systems require tremendous capabilities for computation which continue to challenge the state of the art in the field for current applications and which far exceed the state of the art for contemplated applications. The performance of computer systems has generally been evolutionary in that the fundamental architecture has remained in a traditional configuration (sometimes called "Von Neumann" configuration) involving the sequential execution of instructions which individually are rigidly defined. Even such techniques as parallel processing typically involve arrays of traditionally configured processors functioning under the coordination of a master processor. The master processor assigns program activities, typically execution of a portion of the program controlling the data processing operations, to the slave central processing units and coordinates the results of execution of the program portions from the slave central processing units. Aside from certain decisions executed by the master processor at the end of instruction sequence portions, only modest alterations in the complete program are possible. Virtually all known present and contemplated (insofar as they are disclosed in the literature) system architectures can be analyzed and identified as Von Neumann variations.

One of the present trends for computer system architectures is toward very fast processors having relatively limited command structures, generally known as reduced instruction set (RISC) computers. Thus, it is not unlikely that most future computers will be more elementary than those in current use, but will provide ultrafast processing of instruction and data operands. One significant drawback for this possible evolutionary path is that more and more of the "responsibility" for system performance falls on the software, and it is the experience of the industry that the performance of many otherwise exemplary computer systems remains software limited. That is, the ultimate performance of the systems is limited by inefficiencies which are simply unavoidable in all but very short programs written in machine language.

Many future applications, such as in artificial intelligence, advanced space technology and the like, impose computational requirements which exceed the ability of traditional Von Neumann systems, no matter how closely the theoretical speed limits are approached, and no matter how configured or arrayed.

Thus, it will be appreciated by those skilled in the art that the fundamental architectural approach for large scale, powerful systems must be rethought if demanding future applications are to be dealt with effectively. It will therefore be commensurately appreciated by those skilled in the art that it would be highly desirable to provide a new architectural structure by the use of which the fundamental and inherent limits of conventional computer systems may be avoided.

OBJECTS OF THE INVENTION

It is therefore a broad object of my invention to provide a new computer system architecture.

In another and fundamental aspect, it is an feature of my invention to provide a computer system architecture which permits of modification of the computer instruction set.

It is a further feature of my invention to provide a computer system architecture in which the computer instruction set can be modified by stored program control.

It is more specific feature of my invention to provide a computer system architecture in which the processing of the computer instruction set, whose execution is coordinated by a program control computer, is divided into a plurality of sub-activities, each sub-activity being processed by an individual instruction computer.

It is a still further feature of my invention to provide means in each instruction computer for modifying the effects of processing a sub-activity prior to or during processing of the sub-activity.

SUMMARY OF THE INVENTION

These and other features of my invention are achieved by employing a unique computer system architecture in which a program control computer is in communication with a bank of instruction computers. The program control computer transfers instructions and related operands to the instruction computers, while the instruction computers transfer status information relating to the instruction sequence execution. The program control computer includes instruction execution coordinating means which responds to the processing of a computer instruction sequence by dividing the processing to be performed in response to the computer instruction set, by assigning a portion of the processing activity to a selected instruction computer, and by transferring the portion of the instruction sequence of the computer instruction set capable of performing the activity to the selected instruction computer to perform the assigned portion of the activity. Each instruction computer includes programmable instruction decoding means which serves to identify the microtasks required for executing the instructions transferred to the selected instruction computer from the control computer. The programmable instruction decoding means are further adapted to respond to instruction modification signals applied thereto from the program control computer to change the microtasks identified as necessary for executing the instructions necessary for implementing the portion of the activity assigned to the selected instruction computer. The programmable instruction decoding means has the ability to change dynamically the execution of the instruction subset in the instruction computers even to the extent of changing a portion of the instruction sequence of the selected computer. The power of the system may be increased by extending levels in a two-dimensional array and extending the multi-level systems in a three-dimensional array.

BRIEF DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 1 is a major block diagram of an exemplary computer system employing the present architecture;

FIG. 3A is a block diagram illustrating the apparatus for transmitting instruction sequence status information to the program control computer, while FIG. 4 illustrates the extension of the system of FIGS. 1 and 2 into multi-level two-dimensional arrays and three-dimensional arrays of multi-level systems.

DETAILED DESCRIPTION OF THE PREFERRED EMBODIMENT

1. Detailed Description of the Figures

Figure 2:
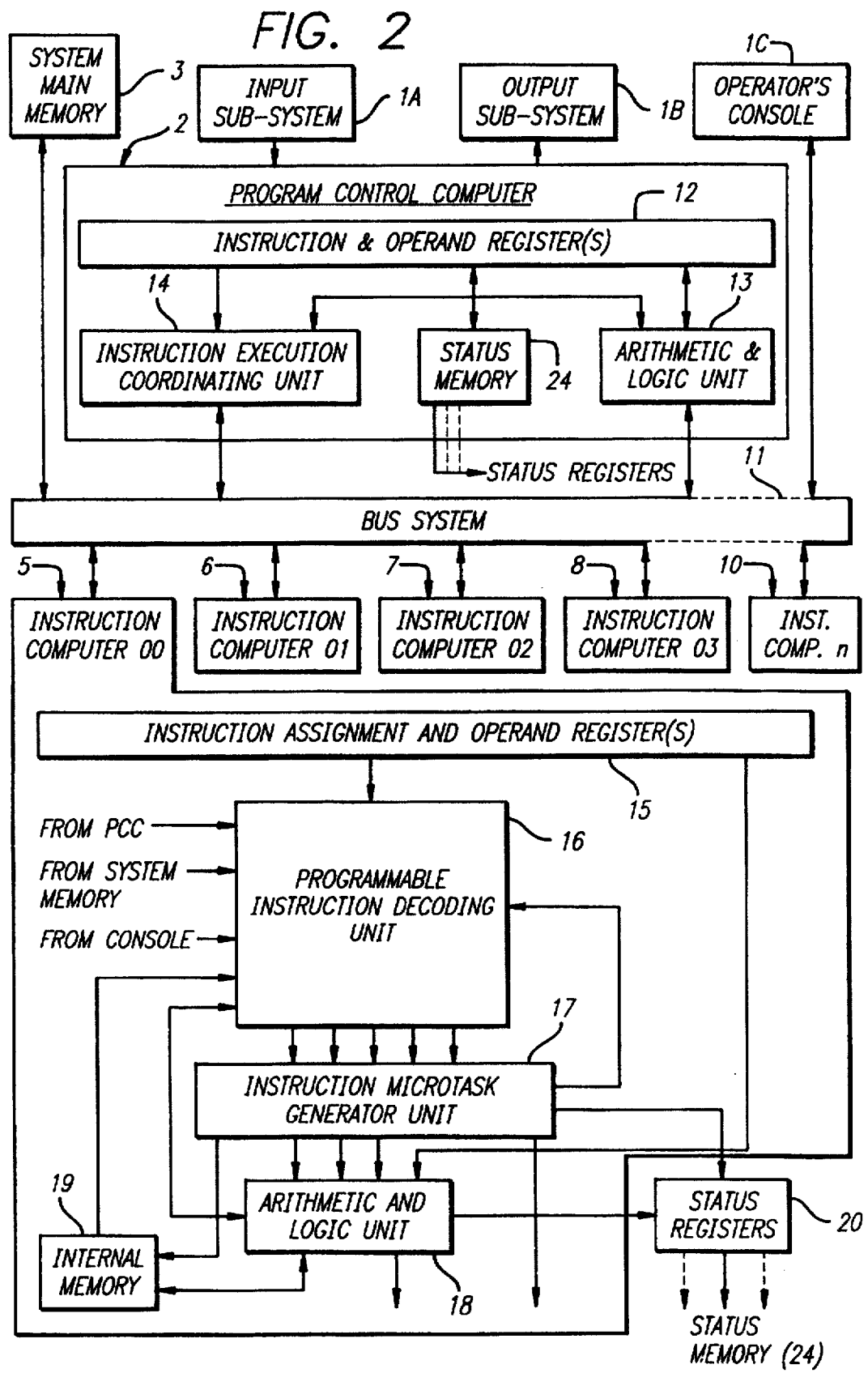
FIG. 2 is a more detailed block diagram of the system of FIG. 1.

The major block diagram of FIG. 1 illustrates a fundamental aspect of the present invention which sets it apart from prior art data processing system architectures. The system of FIG. 1 includes any suitable aggregation of input/output devices and mediums 1 in communication with a high speed program control computer 2. Also in communication with program control computer 2 is a system main memory 3 which may consist of any assemblage of memory storage means appropriate to a given system application. Both the high speed program control computer 2 and the system main memory 3 are in communication with a bank of instruction computers 4. As few as one instruction computer could comprise the bank 4, but efficient embodiments of the invention preferably include at least as many instruction computers in the bank 4 as there are instruction sequence subsets (or macroinstructions) in the repertoire of the high speed program control computer 2. Thus, the bank of instruction computers 4 illustratively include instruction computer (00) 5, instruction computer (01) 6, instruction computer (02) 7, instruction computer (03) 8, an indeterminate number of instruction computers 9 and instruction computer (n) 10 which represents the final instruction computer in the illustrative bank 4.

It will be understood that the high speed program control computer 2 does not itself execute all the instructions (and macroinstructions) in a program executed by the system, but rather assigns the execution of an instruction subset in its instruction set to one instruction computer among the bank 4. Merely by way of elementary example, when the computer system is to execute a sort program for a large number of operands, the program control computer, in response to the operator inserted instructions in the control or superprogram, divides the sorting activity into sub-activities of sorting a plurality of selected groups of operands, each selected group of operands being sorted by an instruction computer assigned by the program control computer. After the initial sorting of the operands, then two operand groups, which have been processed by an initial sort, can be assigned to selected instruction computers by the program control computer. Note that the merging operation can require a different instruction subset than the original sorting algorithm and the new instruction sequence portion can be transferred to the instruction computer or the instruction sequence portion already stored in the assigned computer can be corrected.

A second fundamental aspect of the architecture of the system comprising the present invention is that, as will be discussed more fully below, means are included in each instruction computer in the bank 4 for altering the meaning and consequent execution of an instruction to be performed (or being performed) by an instruction computer. Similarly, during the original sort, one of the instruction computers can complete the assigned sort operation prior to completion by any of the other instruction computers. The early completion of the sort process by one of the instruction computers can be signaled to the program control computer. In response, the program control computer can reallocate the operands to be sorted, i.e., from the still active instruction computers to the instruction computer that has completed the originally assigned sort operation. The source for directing the change in the execution of an instruction may originate from the system program or superprogram being performed, from human intervention as through an operators' console, or from within the assigned instruction computer itself. The modification of an instruction or execution of an instruction is typically initiated by intermediate results of the instruction sequence portion by the instruction computer.

FIG. 2 is a more detailed block diagram of the system illustrated in FIG. 1. In FIG. 2, the input/output devices/medium 1 has been separated into input sub-system 1A, output sub-system 1B, and operators' console 1C. The program control computer 2, the system main memory 3 and the illustrated instruction computers 5,6,7,8, and 10 from the bank of instruction computers are all coupled for mutual communication through a comprehensive bus system 11. The operators' console 1C also has access to the bus system 11, and it is contemplated that some embodiments of the invention would be most efficient if the input sub-system 1A and output sub-system 1B had direct access to the bus system 11. The input sub-system 1A and the output sub-system 1B are not of direct import to the fundamental aspects of the present invention and are therefore shown in FIG. 2 as communicating only with the program control computer 2.

High speed program control computer 2 includes instruction and operand register(s) 12 for receiving and temporarily storing instructions and any associated operands from, for example, the system main memory 3. An arithmetic and logic unit 13 in the program control computer 2 communicates with the instruction and operand registers 12, the bus system 11, and an instruction execution coordinating unit 14 which performs supervisory functions pertaining to execution instruction within the system. The instruction execution coordinating unit 14 also accesses the bus system 11 and serves to monitor continuously and regulate the relationship between the program control computer 2 and the instruction computers. The instruction execution coordinating unit 14, upon determining the identification of a macroinstruction to be prosecuted in accordance with the currently executing program, determines the specific instruction computer to which that macroinstruction is currently assigned for execution, determines the status (i.e., availability or potential availability) of the assigned instruction computer and, when appropriate, causes an indication that the instruction computer is to commence its execution function operating on such operand information as may be supplied to it via the bus system 11, as may be available from the results of previous execution(s) or both.

The program control computer 2 includes a status memory 24. The status memory 24 is coupled to the instruction and operand register(s) 12 to the instruction execution coordinating unit, and to the arithmetic and logic unit 13. The status memory 24 receives signals from status registers 20 in each of the instruction computers. In addition to status information relating to the operation of the instruction computer such as the availability of the instruction computer, the status signals of the present invention communicate information and intermediate results of the instruction sequence portion being executed by the instruction computer. The status signals in the status memory 24 are processed by the apparatus in the program control computer in a manner determined by the superprogram. On the basis of the information and intermediate results, the program control computer, in response to interpretation of the status signals by the superprogram, can provide modification instructions, where appropriate, to the instruction computers thereby increasing the execution efficiency of the system.

The instruction computers comprising the instruction computer bank are, for most contemplated applications, preferably essentially identical to one another; however, this is not a constraint on the inventive system architecture, and it is further contemplated that a hierarchy of instruction computers of differing power may be more appropriate for certain system applications.

Thus, instruction computer (00) 5 includes instruction assignment and operand register(s) 15 for receiving and temporarily storing the information necessary to execute the instruction for which instruction computer (00) 5 is directed and set up to perform. On commencement of execution, a programmable instruction decoding unit 16 is activated and issues signals to instruction microtask generator unit 17. The information contained in the signals applied to the instruction microtask generator unit 17 from the programmable instruction decoding unit 16 depends upon the current decoding configuration of the latter. The instruction microtask generator unit 17 responds to the applied signals by issuing signals representing the microtasks which must be performed in the system to execute the instruction subset assigned to the instruction computer (00) 5 as currently interpreted by programmable instruction decoding unit 16 in instruction computer (00). These microtask signals are applied, as may be appropriate, to an arithmetic and logic unit 18 in the instruction computer 5, an internal memory 19 in the instruction computer, a status register 20 in the instruction computer and back to the programmable instruction decoding unit 16 in the instruction computer. Such microtasks, if any, as may be necessary for performance outside the instruction computer 5 to complete instruction execution are issued to the bus system 11 and communicated to their destination. Preferably, each instruction computer in the bank is capable of generating a comprehensive set of microtask signals to effect any data manipulation of which the system is capable. Thus, each instruction computer has the inherent ability to perform powerful macro-instructions which may evolve therein.

Arithmetic and logic unit 18, internal memory 19, and programmable instruction decoding unit 16 may all communicate among one another. The arithmetic and logic unit 18 also receives operand information from the instruction assignment and operand register(s) 15, issues signals to the status register 20, and also is capable of placing information on the bus system 11 for destinations external to the instruction computer 5.

A primary feature of the programmable instruction decoding unit 16 is its programmability. That is, it may be reconfigured to issue a different set of signals to the instruction microtask generator unit 17 whereby a given instruction may be interpreted and executed differently during different instruction cycles. Thus, a programmable instruction decoding unit 16 may be reconfigured under the influence, separately or in conjunction with one another, of external signals from the program control computer, system memory, or from the console under the influence of a programmer. From internal sources, the programmable instruction decoding unit 16 may be reconfigured by signals from the arithmetic and logic unit 18, internal memory 19, and the instruction microtask generator 17. The modification of the programmable instruction decoding unit 16 can also be performed under control of the superprogram in the program control computer.

It will therefore be understood that the actual interpretation and execution of an instruction received by an instruction computer may be varied from execution cycle, to execution cycle during a single execution cycle as a result of the interpretation of intermediate results or for other reasons which render the "adaptation" of the precise execution of the instruction to be desirable.

The significance of the system architecture presented herein will now become more apparent to those skilled in the art. By this system architecture, not only can the system, as a whole, "learn" to execute a program more efficiently, but the instructions themselves can be adapted between successive executions and even during execution. Because of this ability to learn and adapt, the spread of system responsibility between software and hardware can be optimized; i.e., the system becomes less software-bound since the software need not be as complex and detailed as with traditional high speed computer systems in which the "definition" of individual instructions remains fixed or only slightly modifiable within strict and predetermined limits.

The actual logical design of several constituents of the system illustrated in FIGS. 1 and 2, particularly those of the program control computer 2 and the instruction computers in the bank 4 as exemplified by the instruction computer 5 straightforwardly follow their function and can be carried out according to conventional techniques. It may be noted that the operating systems employed, respectively, in the program control computer 2 and in the instruction computers need not necessarily be the same. An instruction computer need only be furnished with operand-like information if necessary, instruction modification information if applicable, and an indication that it is to commence undertaking its internally defined and adaptable instruction sequence and have the results available when completed (or at an intermediate point) as indicated by the status register 20. Therefore, the instruction computers, operating at a different level from the program control computer, are somewhat independent and can use an operating system optimum for their structure as chosen by the logic and circuit designers.

Communication (over the bus system 11 and otherwise such as in dedicated channels) between the various system constituents may be performed in parallel, in series, or in a combination series/parallel manner as, again, the detailed design of an individual system may prescribe.

Figure 3A:
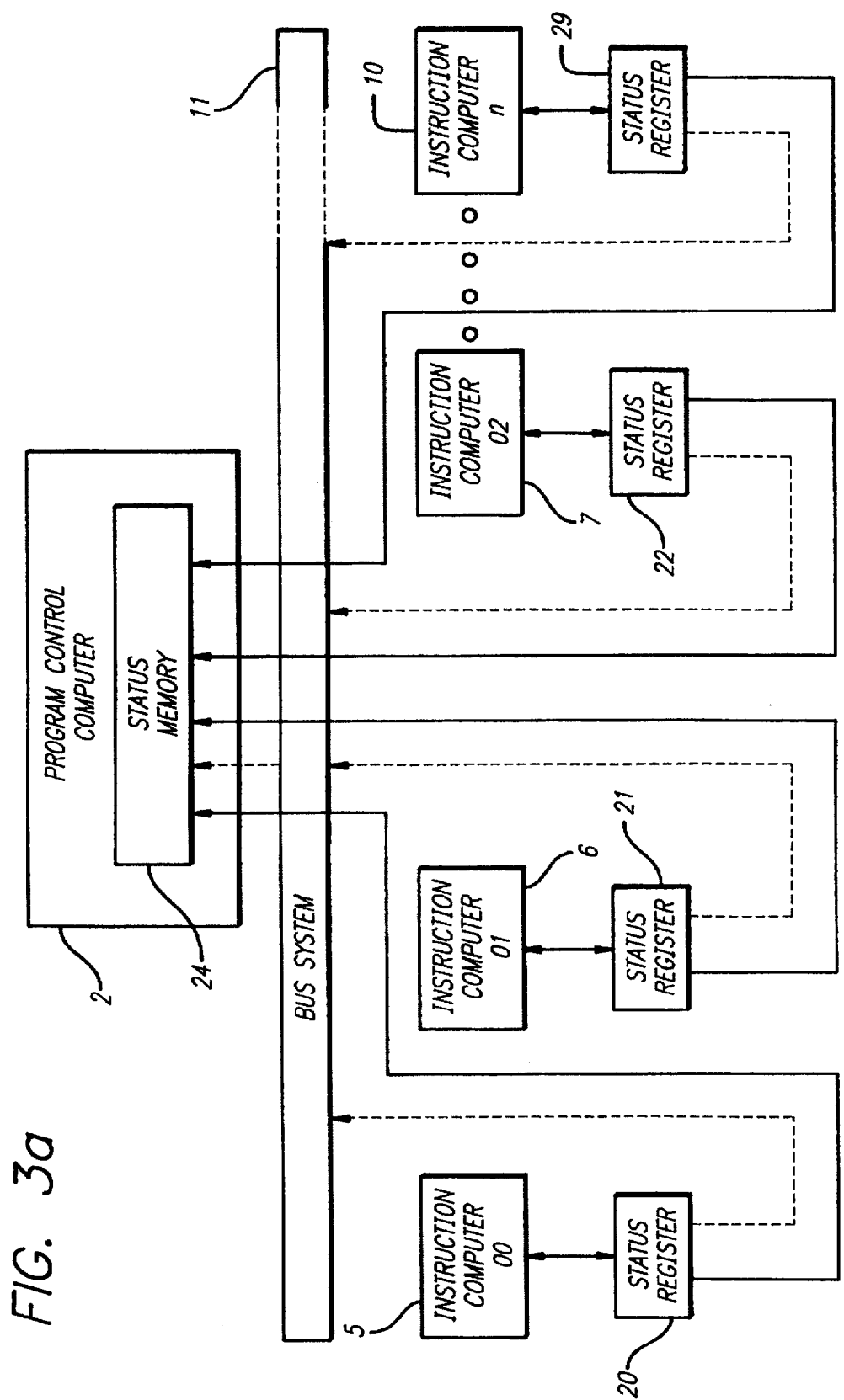

The status register 20 in FIG. 2 is shown as being separate from the associated instruction computer. In the present invention, the status signals have an expanded role. In addition to the typical information with respect to the state of the associated instruction computer, the status register can receive predetermined signals defining the instruction sequence status. This information, transferred to the status memory 24 in the program control computer, can result in a modification instruction transferred to the instruction computer, permitting the instruction computer to process the instruction sequence portion more efficiently. Referring to FIG. 3A, the relation of the status registers 20 through 29 is illustrated each coupled to an associated instruction computer 5 through 10, respectively. In FIG. 3A, the status registers 20 through 29 are shown coupled directly to the status memory 24. This direct coupling of the status register 20 through 23 with status memory 24 provides the most efficient technique of transferring the status signals to the program control computer. However, as the number of instruction computers increases, to eliminate separate electrical leads, the status signals can be transferred to program control computer via the bus system 11 (or a subsystem thereof) as indicated by the dotted lines. The status memory 24 must be interrogated continuously to identify status parameters which require an alteration of program execution of at least one instruction computer. It can be shown that the optimum performance, with respect to monitoring the status memory 24, is achieved when the status memory 24 is comprised of square arrays of storage elements, i.e., for 900 instruction computers, the status memory 24 is a 30×30 element array. The number of arrays comprising the status memory 24 is determined by the number of status parameters generated by the instruction computers' executing programs. Exemplary status parameters include the instruction computer identification number, program execution status, real time data, etc.

Figure 3B:
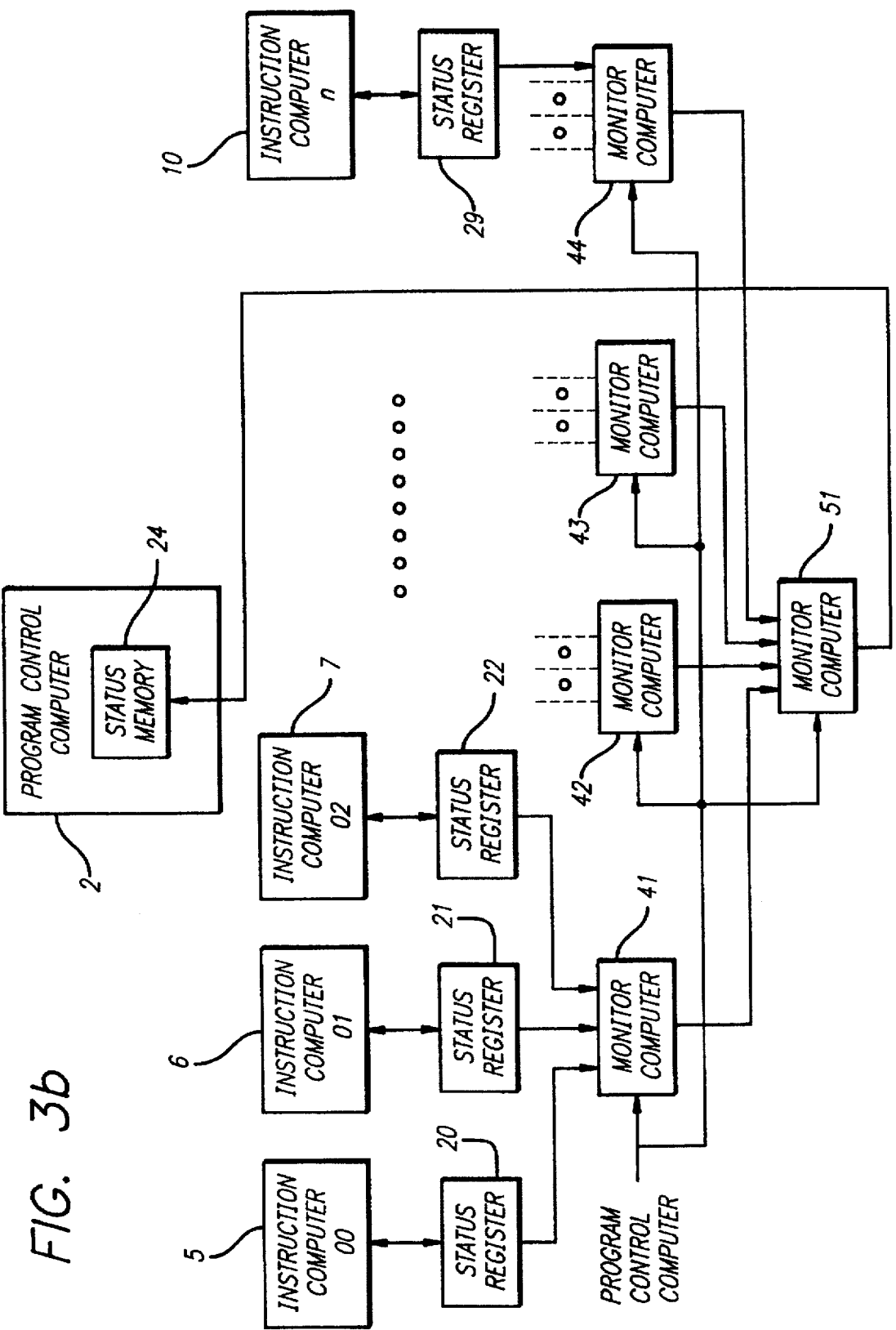
FIG. 3B is a block diagram illustrating the apparatus required for transmitting instruction sequence status information from the instruction computers to the program control computer in large data processing systems.

In FIG. 3B, a more complex system is illustrated. In this architecture, the contents of each status register 20 through 29 are applied to a monitor computer 41 through 44. Each of the plurality of monitor computers 41 through 44 is coupled to a second level monitor computer 51. Each monitor computer 41 through 44 is provided with an instruction sequence portion, typically from the program control computer 2, that permits the analysis of the status signals external to the program control computer 2. The second level monitor computer 51 can process the results of monitor computers 41 through 44 and prioritize the status signals prior to transfer to the status memory 24. This analysis relieves the program control computer 2 of this responsibility. In addition, priority determination can be performed by the monitor computers, once again relieving the program control computer of this responsibility. Thus, the instruction alteration or modification can be implemented by the program control computer with a minimum of processing. This feature becomes more important as the number of instruction computers is increased. As will be clear any number of monitor computers or levels of monitor computers can be employed, the incremental increase in status signal processing for each additional monitor computer coming at the expense of additional apparatus and data processing system complexity. The monitor computer can be coupled directly to the status registers, to the other monitor computers, and to status memory or can exchange signals by means of the bus system 11, dedicated bus units, or any combination thereof. More than one monitor computer can apply signals to status signals memory 24 depending in the system configuration. The programs controlling the status signal processing by the monitor computers is a part of the superprogram and is transfered to the monitor computer(s) by the program control computer.

The system shown in FIG. 2 is essentially unidimensional in that there is shown only a single program control computer, a single bank of instruction computers, and a single level of main memory and input/output. However, the system architecture is especially well adapted for integration into very large scale two-dimensional and three-dimensional supersystems particularly including those subject to reconfiguration under program control. Referring now to FIG. 4, representations of such supersystems employing extensions of the architecture of the present invention are presented. It will be seen in FIG. 4 that multi-level system (O) 25 comprises a series of program control computers 26 disposed in levels O–P. Similarly, a series of instruction computer banks 27 are disposed at levels O–M and a series of system memories 28 are disposed at levels O–L. (Thus, each level of the multi-level system 25 comprises much of the structure illustrated in FIG. 2) Communication both within a level and among different system levels may be carried out across a three-dimensional multi-bus system 29. Input/output 30 may be coupled into the system at one or more levels, typically interfacing either with the multi-bus system 29 or one or more program control computers.

The two-dimensional supersystem comprising multi-level system O may be further extended by interfacing the multi-bus system 29 with additional multi-level systems 1-Q 31. It will be apparent that, under program control, the instruction computers at different levels in multi-level system (O) 25 can be accessed by the program control computers 26 and memories 28 at diverse levels in order to achieve not only redundancy, but the ability to adapt to a complex problem virtually to the extent of realizing the equivalent of a hard-wired, completely special purpose system. The provision of additional multi-level systems 31, within practical limits, further extends the system power to adapt.

In a multi-level system, one program control computer must generally be dominant in order to direct system reconfiguration as may be useful and to resolve conflicts which may arise from, for example, attempts by multiple program control computers to access a given instruction computer. Similarly, in a three-dimensional system including a plurality of multi-level systems, a hierarchy must be established, and a single program control computer will be the ultimate arbiter.

Referring again to FIG. 2, it will be noted that system initialization is a substantial event because each of the instruction computers must be made aware of its initial instruction decoding configuration. Initialization may be performed by running, in the program control computer 2, an initialization program which assigns to each instruction computer bank its beginning instruction sequence. Alternatively, an initialization signal may be applied to each instruction computer which has permanently stored therein (as in internal memory 19) the key to its initial instruction decoding. For achieving the most flexibility and for providing redundant capability against the failure of one or more instruction computers, the former procedure is preferred.

As previously noted, the logical design of individual computer systems employing the novel architecture set forth herein is susceptible to performance using standard techniques and will vary according to the system size, intended application, logic family chosen, etc.

2. Operation of the Preferred Embodiment

The present invention involves the use of a multiplicity of instruction processors, operating in parallel, to execute lengthy and/or complex programs. The program or superprogram is generally created in the linear instruction sequence format, i.e., in the form which could be executed by a "Von Neumann" configuration data processing system. The superprogram is then divided, by the program creating entity, into a plurality of programs capable of being executed independently of the superprogram. Each divided portion of the superprogram is identified by a macroinstruction. A macroinstruction can have associated therewith modification macroinstructions that, in response to a condition or conditions associated with a macroinstruction, an instruction or instructions of the macroinstruction itself or the apparatus processing the macroinstruction, can be modified. The superprogram includes load macroinstruction instructions, a load macroinstruction instruction causing the associated portion of the superprogram to be executed by an identified instruction processor. The superprogram also includes macroinstruction modification subroutines which can modify instructions in the instruction computer executing the superprogram portion. The macroinstruction modification subroutines are activated in response to operator entered signals or in response to status signals generated by a macroinstruction which is being executed in an instruction computer.

The operation of the preferred embodiment will now be described with reference to a specific example. One of the most daunting of the modern computational problems involves weather forecasting. A large grid of irregularly spaced measurement points provides the input data, the measurements including measurement of parameters in the third dimension. The superprogram associated with the weather prediction would have the processing divided into a multiplicity of programs, each program identified by a macroinstruction and capable of being executed independently. By way of specific example, each of the parallel processors can be assigned the calculation of forecast points for specific grid points. In these macroinstructions, the only difference can be the addresses in system memory, associated with the assigned grid points, to which the instruction processor has access. After initialization of the entire system, the superprogram is entered into the program control computer. In response to the superprogram, macroinstructions are loaded into the instruction computers. Once loaded into an instruction computer, a macroinstruction causes the instruction sequence which the macroinstruction identifies to be loaded into the instruction computer and executed.

During execution of the instruction sequence identified by the macroinstruction, it may be necessary to alter the instruction sequence. By way of specific example, two methods of initiating the alteration in the instruction sequence can be provided. First, an operator can be alerted that weather conditions of an exceptional nature are in progress and the priority associated with the weather forecasting superprogram must be altered. The operator thereafter enters instructions into the system by means of the console which result in changes in the instruction sequences associated with (selected) macroinstructions. In the second method, parameters associated with the processing of each macroinstruction are transferred to the program control computer. The program control computer, in response to specific exceptional weather conditions, e.g., a change in temperature of greater than a predetermined amount in a specified period of time, can also cause a change in the priorities of the weather forecasting procedure. The change in priorities can result in a requirement for change in the execution of a program sequence. By way of specific example, a change in temperature of more than a predetermined amount can require more expeditious processing of data for specific grid points. Typically, the options that will permit an expedited processing of data are the result of the execution of a new instruction sequence, an alteration in a instruction in the selected instruction sequence, a change in the apparatus of the instruction computer, or a reallocation of central processing unit resources. Each of these responses will be programmed into the superprogram responsible for the operation of the program control computer. The program control computer will monitor certain parameters of each instruction computer and the identification of the presence of preselected parameter values, parameter values typically transferred from the program control computer to the instruction computer by means of the status register, will result in the alteration of the instruction sequence in the instruction computer. The aborting of a currently executing instruction sequence and the execution of a new program, identified by a macroinstruction in the superprogram is self-explanatory. With respect to modification of the executing instruction sequence, a modification macroinstruction can cause an instruction at a predetermined address to be altered. For example, an instruction at the predetermined address can be altered to become an unconditional branch instruction, the program branch instruction eliminating portions of the instruction sequence and expediting processing of the data in what has become a modified instruction sequence. A modification macroinstruction can also be used to control the signals to the instruction microtask generator. For example, an operand address register used to access addresses in the operand register and normally incremented by 1 can be altered and the operand address register incremented by n. In this manner, the intervening operands can be ignored and the processing of the instruction sequence expedited by processing a selected subgroup of the data operands. With respect to reallocation of system resources, an identified region on the weather forecasting grid can become more important than other points on the grid. In this situation, the program control computer can reduce the number of grid points assigned for processing to selected computers, thereby reducing the work load of the instruction computer processing data associated with the assigned grid points and permitting expedited processing. As will be clear to those familiar with weather forecasting procedures, the processing procedure is iterative and the grid points are inter-related. Therefore, the reallocation of central processing unit resources can have system-wide effects which must be accommodated in the superprogram. It will be further clear to those skilled in the art of complex programming structures that the response to a predetermined parameter can include a plurality of the instruction modification techniques described above. It will be further clear that the list of modification techniques described above is illustrative and not exhaustive. In each case, the response to the predetermined parameter identification by the program control computer has been programmed into the superprogram. In the preferred embodiment, the alterations in the macroinstructions or their execution in the instruction computers are performed under control of or in response to the superprogram being executed in the program control computer. As will be clear to those skilled in the art, the parameter information stored in the status registers or elsewhere in the instruction computer can be retrieved by the associated instruction computer and used to modify the macroinstruction or the execution of the instructions forming the macroinstruction without the intervention of the superprogram or the program control computer. The direct use of parameter information by the associated instruction computer has the advantage of not requiring responsive activity by the program control computer, an important consideration when a large number of instruction computers are employed to execute the superprogram. However, this technique for macroinstruction execution modification is not suitable if the modification has implications for independently executing instruction computers, i.e., system wide implications.

The macroinstruction execution modification procedures described above permit the data processing system to adapt with heretofore unavailable efficiency to selected parameters and to new priorities. In addition, when the parameters include preselected criteria of performance, the data processing system can compare the results of system modification against the preselected criteria and can learn to execute the superprogram in a more efficient manner.

The operation of the present invention is believed to be apparent from the foregoing description and drawings, however, a few words will be added for emphasis. The present invention provides for the execution of portions of a superprogram by a program control computer among a plurality of instruction computers. Each instruction computer provides intermediate results of the program portion being executed to the program control computer by means of a status memory. When an intermediate result has a preselected value, the program control computer will cause an alteration in the processing of the program portion of at least one instruction computer. The alteration of the program portion processing is determined by the superprogram controlling the program control computer. As a result, the status of the entire computer system can be determined and the program portion processing by the instruction computers altered to increase the system performance.

Therefore, while the principles of the invention have now been made clear in an illustrative embodiment, there will be obvious, to those skilled in the art, many modifications of structure, arrangements, proportions, and the elements used in the practice of the invention which are particularly adapted for specific environments and operating requirements without departing from those principles.

What is claimed is:

1. A general purpose data processing system for executing a program, said data processing system comprising:
   communication means for transferring signals thereon;
   a program control computer coupled to said communication means for controlling execution of said program, said program control computer including a status memory; and
   a plurality of instruction computers coupled to said communication means, said instruction computers executing portions of said program assigned thereto by said program control computer, each of said instruction computers including adaptive means for altering the execution of said program portion assigned thereto in response to instruction modification signals including a) internal control signals generated by computation of said instruction computer and b) program control signals generated by said program control computer in response to status information stored in said status memory; said adaptive means including instruction decoding means responsive to said instruction modification signals for altering microtasks performed during execution of said program portion assigned to said instruction computer; each said instruction computer including a status register bank for storing status signals indicative of parameters of said assigned program portion being executed by said instruction computer, said status signals stored in said status register bank being transferred to said status memory to update said status information stored therein, wherein predetermined program control signals are applied to a selected instruction computer by said program control computer in response to updated status information stored in said status memory.

2. The data processing system of claim 1 further comprising a memory means coupled to said communication means for storing data and instructions required for executing said program.

3. The data processing system of claim 2 wherein said instruction computers are divided into groups, said data processing system further comprising a monitor couputer associated with each instruction register group and coupled to said group instruction computer status register banks.

4. The data processing system of claim 2 further comprising:
   a second level program control computer coupled to said communication means; and
   a second level plurality of instruction computers coupled to said communication means.

5. The data processing system of claim 2 wherein said status register has a generally square array of elements.

6. The data processing system of claim 2 wherein said predetermined program control signal alters a memory addressing procedure in an instruction computer to which the program control signal is applied.

7. A method of executing a superprogram, said method comprising the steps of:
   controlling execution of said superprogram by a program control computer;
   assigning portions of said superprogram by said program control computer to instruction computers for execution;
   in each instruction computer, storing status signals indicative of parameters of execution of said superprogram portions assigned by said program control computer to said instruction computer for execution in a register bank associated with said instruction computer;
   transferring said status signals to a status memory in said program control computer, said program control computer monitoring said status signals; and
   in response to predetermined status signals identified by said superprogram in said status memory, transferring a predetermined program control signal to a selected instruction computer, said adaptive means in said selected instruction computer responding to said predetermined program control signal by altering execution of said superprogram assigned portion by said instruction computer by changing microtasks performed during such execution.

8. The method of claim 7 further comprising the steps of:
   dividing said instruction computers into groups; and
   monitoring status register banks of each group of instruction computers with a monitor computer.

9. The method of claim 7 further comprising the step of configuring said status memory into a generally square array of storage elements.

10. The method of claim 7 further comprising the step of executing a second level of said super program with a second program control computer and a second plurality of instruction computers.

11. The method of claim 7 wherein said transferring a predetermined program control signal includes a step of altering addressing of a memory means by said instruction computer.

12. The method of claim 7 which includes the additional step in which said adaptive means in said selected instruction computer responds to predetermined conditions sensed by said selected instruction computer during execution of said superprogram assigned portion and altering execution thereof by changing microtasks performed during such execution.

13. A general purpose multiprocessor, hardware/software data processing system for executing a superprogram, said data processing system comprising:

memory means;

a plurality of instruction computers, each instruction computer including a status register bank for storing status signals indicative of a status of a currently executing instruction set, each instruction computer further including adaptive means for altering the execution of said currently executing instruction set in response to program control signals;

a program control computer including a status memory, said program control computer assigning instruction sets of said superprogram to said instruction computers in response to said superprogram; and signal transferring means for electrically coupling components of said data processing system for transferring signals therebetween, said signal means transferring status signals from said instruction computer status register banks to said status memory to update said status memory, said program control computer monitoring said status memory under control of said superprogram, said program control computer transferring a predetermined program control signal to an instruction computer in response to a predetermined status signal to cause said adaptive means to alter execution of said currently executing instruction set in accordance with said transferred predetermined program control signal.

14. The data processing system of claim 13 wherein said instruction computers are divided into groups, said data processing system further including a monitor computer coupled to said status register banks of each group of instruction computers, said monitor computor monitoring and prioritizing status signals prior to transfer to said status memory.

15. The data processing system of claim 13 further comprising:

a second level program control computer coupled to said signal transferring means; and a second plurality of second level instruction computers coupled to said signal tranferring means.

16. The data processing system of claim 13 wherein said status memory is comprised of a square array of storage elements.

17. The general purpose multiprocessor, hardware/software data processing system for executing a superprogram of claim 13 in which said adaptive means is further adapted to alter the execution of said currently executing instruction set in response to predetermined conditions sensed by said selected instruction computer during execution thereof.

* * * * *